May 30, 1967     H. L. TRAUTMANN     3,321,948
METAL WORKING MACHINE

Filed March 26, 1965     2 Sheets-Sheet 1

INVENTOR.
HERBERT L. TRAUTMANN
BY
ATTORNEY

May 30, 1967     H. L. TRAUTMANN     3,321,948
METAL WORKING MACHINE
Filed March 26, 1965     2 Sheets-Sheet 2
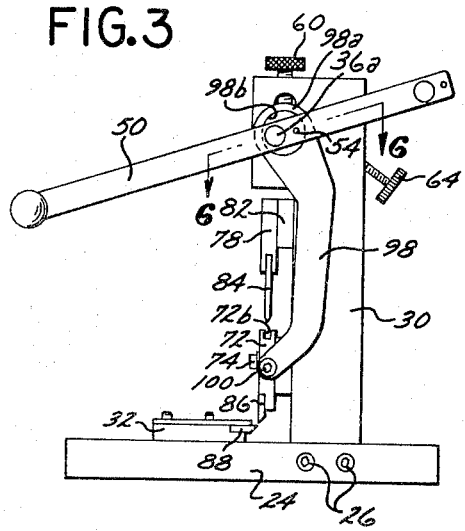
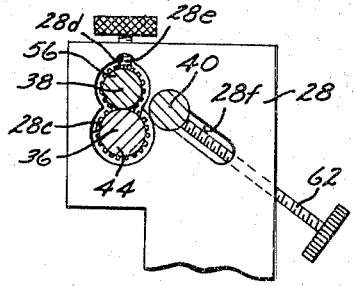
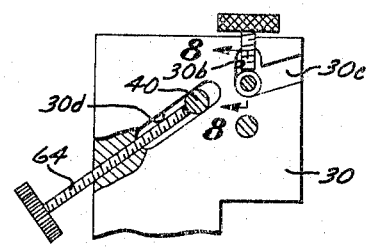
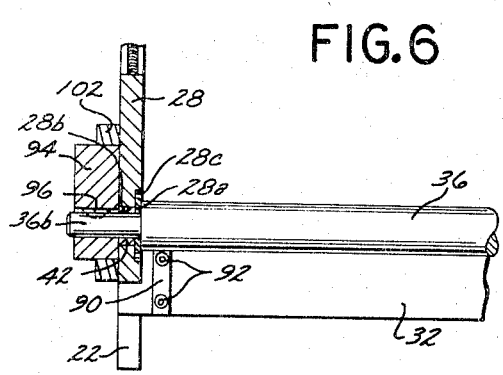
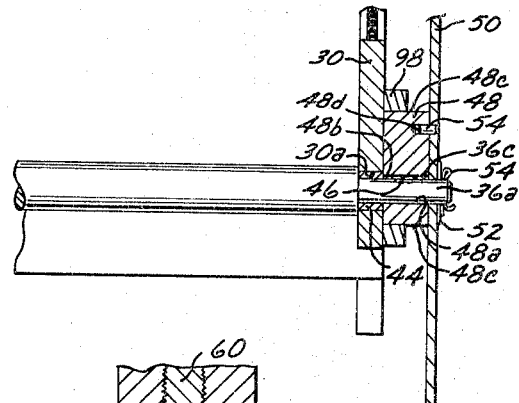
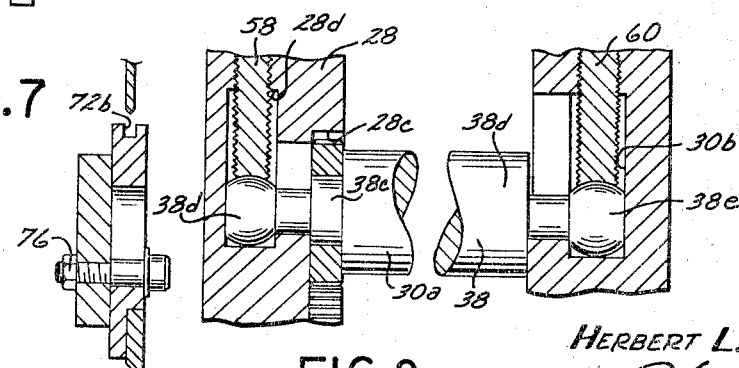
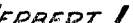
INVENTOR.
HERBERT L. TRAUTMANN
BY
ATTORNEY

United States Patent Office 3,321,948
Patented May 30, 1967

3,321,948
METAL WORKING MACHINE
Herbert L. Trautmann, 873A W. 15th St.,
Newport Beach, Calif. 92660
Filed Mar. 26, 1965, Ser. No. 442,946
6 Claims. (Cl. 72—130)

The present invention relates generally to metal working machines, and more particularly to machines for shaping and cutting sheet metal.

Within recent years, lightweight machine tools have become particularly desirable. For instance, today many parts and apparatuses are fabricated of sheet metal which is bent into predetermined shapes and cut into predetermined sizes. Home workshops also can advantageously use a lightweight machine for cutting and shaping sheet metal.

Such lightweight metal working equipment has not heretofore been available, but rather it has been necessary to purchase a separate and distinct machine for performing each individual operation. That is, in order to roll sheet metal into predetermined curved shapes it was heretofore necessary to purchase and employ a roll-form machine. To satisfy the need for providing sheet metal with a right angle bend, it was necessary to have a brake, a tool separate and distinct from the roll-form machine. Also, in order to shear or cut sheet metal it was necessary to have still another machine, namely a shear. It is thus seen that in order to perform the three essential operations on sheet metal, it was necessary to purchase, maintain and use three separate and distinct machine tools. As can be well appreciated, such prior practice has been very expensive so that the home workshop or other lightweight manufacturing facilities have not found it practical to purchase these tools. Rather such sheet metal work has heretofore been contracted to outside fabricating companies.

In view of the foregoing, it has been apparent for some time that a single machine for accomplishing all of these functions is very desirable. Thus, a person or small manufacturing company could purchase a single machine for performing all of the rolling, bending and shearing functions required on sheet metal.

An object of the present invention is to provide a metal working machine for rolling, bending and shearing sheet metal.

Another object of the present invention is to provide a metal working machine as characterized above wherein a single operating handle is employed for simultaneously operating a roll-form, brake and shear.

Another object of the present invention is to provide a metal working machine as characterized above having means for converting the rotary motion of the roll-form into reciprocal motion for the brake and shear.

Another object of the present invention is to provide a metal working machine as characterized above wherein the roll-form comprises three juxtaposed rollers mounted between suitable support members, one of such rollers being quickly and easily removable from at least one of its support members to faciliate removal of a piece of sheet metal following partial forming thereof.

A still further object of the present invention is to provide in a metal working machine as characterized above drive means comprising a rotatable handle operatively associated with the roll-form for rotating at least one of the rollers thereof, and an eccentric element fixed relative to such roller and a drive member associated with such eccentric element whereby rotation of the roller effects simultaneous reciprocal movement of movable elements for both a brake and a shear.

Another further object of the present invention is to provide a metal working machine as characterized above having a single base member and a pair of spaced support members thereon for mounting all three of the metal working tools.

An even further object of the present invention is to provide a metal working machine as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 3 is a side elevational view of the subject metal working machine;

FIGURE 4 is a fragmentary sectional view taken substantially along line 4—4 of FIGURE 2 of the drawings;

FIGURE 5 is a fragmentary sectional view taken substantially along line 5—5 of FIGURE 2 of the drawings;

FIGURE 6 is a fragmentary sectional view taken along line 6—6 of FIGURE 3 of the drawings;

FIGURE 7 is a fragmentary sectional view of the shear and brake, taken substantially along line 7—7 of FIGURE 1 of the drawings, and;

FIGURE 8 is a fragmentary sectional view taken substantially along line 8—8 of FIGURE 5 of the drawings.

Like reference characters indicate corresponding parts throughout the several views of the drawings.

Figure 1:
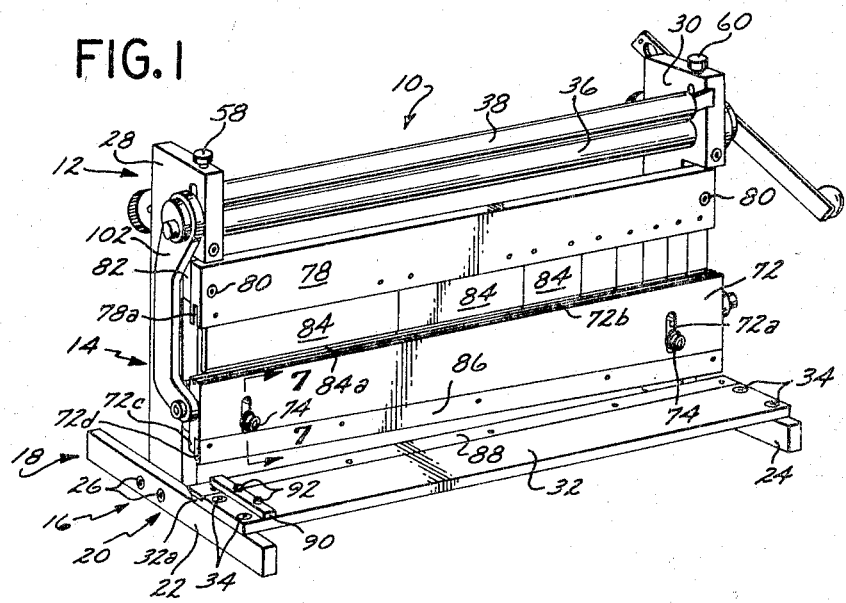
FIGURE 1 is a perspective view of the front, top and left side of a metal working machine according to the present invention.
Figure 2:
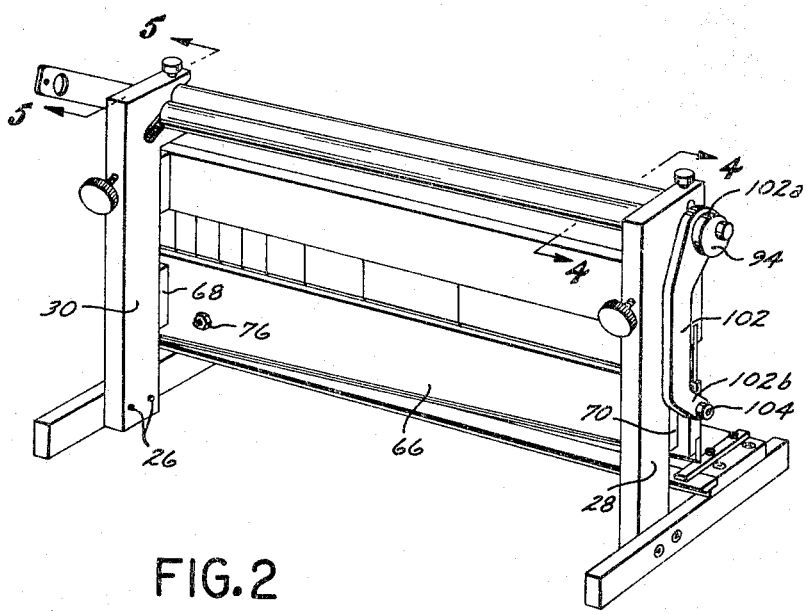
FIGURE 2 is a perspective view of the rear, top and left side of such machine.

Referring to FIGURES 1 and 2 of the drawings, there is shown therein a metal working machine identified generally with the numeral 10. Such machine is constructed to perform three different operations, and thus comprises a roll-form 12, a brake 14 and a shear 16.

All three of the above mentioned devices are mounted on a frame 18 comprising a base 20 having a pair of spaced base members 22 and 24. Attached to such base members in upstanding spaced relation, as by means of bolts 26, are a pair of support members 28 and 30. Each such support member is generally L-shaped and is attached to the respective one of the base members 22 and 24 such as to be disposed in a generally inverted position.

Connected to and between base members 22 and 24 is a horizontal support member 32, fastening bolts 34 being used for this purpose.

As shown most clearly in FIGURE 4 of the drawings, the roll-form 12 comprises 3 juxtaposed rollers 36, 38 and 40 which cooperate to receive a piece of sheet metal and to provide the same with a predetermined arcuate shape. As will be hereinafter more apparent, rollers 36 and 38 are drive rollers for urging the sheet material through the roll-form 12. Roller 36, as shown most clearly in FIGURE 6 of the drawings, is formed with reduced opposite end portions 36a and 36b which extend through suitable openings in the support members 28 and 30.

Support member 28 is formed with an opening 28a having a portion 28b of reduced diameter and a portion 28c of enlarged diameter. A bushing 42 formed of relatively hard heat-treated steel is fitted within the reduced diameter portion 28b of opening 28a. Such bushing has a central through opening for receiving the reduced end portion 36b of roller 36.

A gear 44 is provided on the reduced portion 36b in abutting relation with the intermediate portion of roller 36 to be positioned within the large diameter portion 28c of opening 28a. Such gear, as shown most clearly in FIGURE 4 of the drawings, is for cooperation with another gear for rotation of roller 36 as will hereinafter be explained in greater detail.

Support member 30 is formed with a through opening 30a wherein a hardened bushing 44 having a central through opening is positioned for rotatably receiving the reduced end portion 36a of roller 36.

Reduced end portion 36a is formed with a longitudinal slot 36c for receiving a fastening key 46 for non-rotatably fastening an eccentric element 48 relative to roller 36. Eccentric element 48 is formed with a through opening 48a and a slot 48b adjacent thereto. The key 46 is generally semicircular in shape and firmly fits within the longitudinal slot 36c of end portion 36a and the slot 48b in element 48. This arrangement firmly and non-rotatably secures the eccentric element 48 to the end portion 36a of roller 36.

Any other appropriate fastening means for preventing rotation of eccentric element 48 on roller 36 may be used in place of the fastening key 46, the only requisite being that rotation of element 48 effects rotation of roller 36 as will hereinafter become more apparent.

Eccentric element 48, as shown most clearly in FIGURE 3 of the drawings, is provided with a generally circular outer periphery 48c. The axis of rotation of such element, and roller 36, however, is removed a predetermined distance from the center of curvature of such circular periphery. That is, the axis of the opening 48a is spaced a predetermined distance from the axis of formation of the circular periphery 48c.

Mounted on the end of reduced portion 36a of roller 36 is an actuating handle or lever 50. Such handle is formed with a through opening for receiving such reduced end portion 36a, and a washer 52 and cotter pin 54 are provided on the reduced end portion 36a for maintaining lever 50 adjacent eccentric element 48.

Any appropriate means may be employed for non-rotatably securing lever 50 to eccentric element 48 so that rotation of the former creates rotation of the latter. The means shown in the drawing for illustrating such connection is a shear pin 54 positioned partially within an opening or aperture 48d formed in element 48, and partially within an opening 50a formed in lever 50. Thus, rotation of lever 50 causes corresponding rotation of element 48 and roller 36, the latter rotating within the hardened bushings 42 and 44 within the support members 28 and 30, respectively.

Mounted immediately above the roller 36 and attached to and between the support members 28 and 30, is another roller 38. As shown most clearly in FIGURES 4 and 8 of the drawings, the support member 28 is further formed with a through opening comprising a vertically disposed slot 28d and a circular recess 28e, the latter of which is formed into the aforementioned large diameter portion 28c of through opening 28a.

As shown most clearly in FIGURE 8 of the drawings, roller 38 has a portion 38a provided with a gear member 56, and a generally spherical end portion 38b. The gear member 56 is press fitted onto a reduced portion 38c of roller 38 to be positioned within the recess 28e when the spherical end portion 38b is within the slot 28d. The gear member 56 is thus positioned for mating engagement with gear member 44 of roller 36. When properly engaged, such gears enable the rollers 36 and 38 to rotate simultaneously but in opposite directions, as will hereinafter become apparent.

Support member 28 is further provided with a threaded opening for receiving a finger-operated set screw 58 which engages the end portion 38b of roller 38 for varying the relative position between rollers 38 and 36, as will hereinafter be explained in greater detail.

The opposite end portion 38d of roller 38 is also provided with a substantially spherical end 38e which fits within a recess 30b formed in support member 30. A finger-operated set screw 60 is positioned within a threaded opening in support member 30 to engage the generally spherical end portion 38e as shown most clearly in FIGURES 5 and 8 of the drawings.

As shown in said FIGURE 5, the recess 30b is formed together with an angularly disposed groove 30c. Such groove, as will hereinafter be explained in detail, enables the end portion 38e of roller 38 to be removed from the support member 30, to permit sheet metal work within the roll-form 12 to be removed over the end roller 38.

The roller 40, as shown most clearly in FIGURES 2, 4 and 5, is disposed to the rear of and substantially between the rollers 36 and 38. The opposite ends of such roller 40 are positioned within angularly disposed slots in the support members 28 and 30 as shown respectively at 28f and 30d. Extending through suitable threaded openings in such support members for controlling the position of roller 40 in slots 28f and 30d, are finger-operated set screws 62 and 64 respectively.

Firmly secured to and between the support members 28 and 30 is a horizontally disposed guide member 66. Such guide member is fastened to the respective support members by suitable fastening bolts, and it may be spaced from the support members as by spacers 68 and 70.

Slidably mounted on the face of guide member 66 is a reciprocatably moveable element 72 formed with at least two slots 72a through which fastening bolts 74 extend. Such bolts extend through suitable openings in the guide member 66 and are provided with nuts 76 as shown most clearly in FIGURES 2 and 7.

The head of each such fastening nut may be formed with a flange, or an enlarged washer may be interposed between the head of each bolt and the forward surface of the reciprocatable member 72. Thus, as will hereinafter become readily apparent, by proper adjustment of nuts 76 on bolts 74, the reciprocatable member 72 can be permitted to have sliding movement along and against the forward surface of guide member 66.

The upper edge of moveable member 72 is provided with a generally U-shaped groove as at 72b. Such groove may take substantially any desired form for use in a press brake.

For cooperation with groove 72b of member 72, there is provided between the support members 28 and 30 of frame 20, a stationary mounting member 78. Such member is secured to the respective support members by fastening bolts 80, and may be spaced therefrom by spacers 82 or the like.

Firmly secured to mounting member 78 is a series of brake elements 84 the lower edges of which are individually formed with a V-shape 84a in aligned relation for substantially simultaneous insertion within the generally U-shaped groove 72b of member 72. Each such element 84 is mounted within a downwardly disposed mounting groove 78a in member 78, and suitable fastening means may be employed to retain such elements in this assembled position.

The lower edge 72c of movable member 72 is formed with a generally L-shaped cutout 72d which extends at an angle to a line perpendicular to the movement of the member 72 as will hereinafter become more apparent.

Within such L-shaped cutout 72d there is provided a movable shear blade 86 which is fastened to element 72 by any appropriate means.

Horizontally disposed support member 32 has its rearward edge portion 32a formed with a similar L-shaped cutout for receiving a stationary shear blade 88. Thus, movement of member 72 in a downward direction causes shearing action between the movable blade 86 and the stationary blade 88.

Any appropriate fixtures may be provided on the subject tool such as the guide member 90 secured to the horizontal support member 32 by bolts 92. Such guide member enables sheet material to be sheared at 90° or at any other desired angle to a reference edge or side of the material.

As shown most clearly in FIGURE 6 of the drawings, the reduced end portion 36b of roller 36 is provided with an eccentric element 94 which is substantially identical to the eccentric element 48 on the reduced end portion 36a. A fastening key 96 is press fitted within appropriate grooves formed in end portion 36b and element 94 to cause such members to be firmly and rotatably secured together as above explained with respect to end portion 36a and eccentric element 48.

On either side of metal working machine 10 there is provided an arm or lever for converting rotational movement into reciprocal movement. As shown most clearly in FIGURE 3, an arm or lever 98 is provided for connecting eccentric element 48 to the corresponding side of movable member 72. Such lever 98 is slightly U-shaped and has an upper portion 98a formed with a through opening 98b which slidably receives the eccentric element 48. The lower end 98c of such lever is secured to member 72 as by a fastening bolt 100.

On the opposite side of machine 12 there is provided a slightly U-shaped lever 102 which is substantially identical in size and shape to the aforedescribed lever 98. Such lever 102 has an upper end portion 102a formed with a through opening for loosely or slidably receiving the eccentric element 94. The lower end 102b of lever 102 is connected to the reciprocatable element 72 by a fastening bolt 104 as shown most clearly in FIGURE 2 of the drawings.

The subject metal working machine operates generally as follows.

Rotation of lever 50 in a clockwise direction as viewed in FIGURE 3, effects rotation of roller 36 through the interconnection therebetween afforded by shear pin 54, eccentric element 48 and fastening key 46. Such rotation, of course, causes corresponding rotation of gear member 44 thereby causing gear member 56 and roller 38 to be rotated therewith but in opposite direction.

A piece of sheet metal inserted between the rollers 36 and 38, as viewed in FIGURE 1, will be drawn through the roll-form 12.

Finger-operated set screws 58 and 60 are adjusted in accordance with the thickness of the sheet material being fed between the rollers 36 and 38. The thickness of such material will not vary so appreciably so that the gear members 44 and 56 will remain engaged. For any type or size or sheet material used in the roll-form 12 of machine 10, the rollers 36 and 38, will operate as above described.

The roller 40 can be varied as desired in accordance with the setting of finger-operated set screws 62 and 64. The position of this roller controls the radius of curvature of the arcuate bend formed in the sheet material. That is, with roller 40 disposed in close proximity to the roller 38, an arcuate shape of relatively small radius will be formed in the sheet material. On the other hand, if roller 40 is positioned an appreciable distance from said roller 38, such radius will be relatively large.

In the event a portion of a piece of sheet material is to be provided with a bend or radius of curvature, the finger-operated set screw 60 is backed off to thereby loosen the end 38d of roller 38 frrom the support 30. Thus, as shown most clearly in FIGURE 5 of the drawings, the spherical end portion 38e is removed from the support member through the angularly disposed slot or groove 30c therein. This enables the partially curved sheet material to be removed from the roll-form.

Rotation of lever 50, in addition to operating roll-form 12, also operates brake 14 and shear 16. As the eccentrics 48 and 94 rotate with roller 36, the levers 98 and 102 convert the rotational movement into reciprocatable movement. That is, as the respective eccentric elements rotate, the respective levers 98 and 102 are caused to be moved downwardly and upwardly.

Such motion results in up and down reciprocatable movement of movable element 72 on guide member 66. During such upward movement, the lower edges of the V-shaped forming elements 84 are caused to engage the generally square or U-shaped groove 72b along the upper edge of element 72. By placing a piece of sheet material between such upper edge of element 72 and the V-shaped lower edges of the elements 84, a substantially right angle bend is provided in the sheet material.

The elements 84 are provided in different lengths to enable the operator to provide a right angle bend in sheet material of a given length or width.

Downward reciprocable movement of element 72 effects shearing action between the stationary blade 88 and the moveable blade 86. Thus, by placing a piece of sheet material between such blades, the material is sheared accordingly.

It is thus seen that the present invention provides a metal working tool or machine for rolling, bending and shearing a piece of sheet metal, all of such functions being provided in a single machine and by operation of a single drive lever.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In a metal working machine the combination of a frame having a pair of spaced support members, a metal roll-form mechanism mounted on said frame having at least one roller rotatably mounted on said members, a metal shear comprising a stationary blade on said frame and a moveable blade reciprocatably mounted on said members, and means for simultaneously operating said roll-form and said shear comprising an eccentric element fixed to said roller and a lever interposed between said eccentric element and said reciprocatable blade, whereby rotation of said roller effects reciprocal movement of said moveable blade of said shear.

2. In a metal working machine the combination according to claim 1 wherein said means for simultaneously operating said roll-form and said shear further comprises a manually operable handle fixed relative to said roller for rotation thereof.

3. In a metal working machine the combination of, a frame having a pair of spaced support members, a metal roll-form mechanism mounted on said frame having at least one roller the opposite ends of which are individually rotatably mounted in said support members, a metal brake comprising a stationary member on said frame and a moveable member reciprocatably mounted on said support members for cooperation with said stationary member, and means for simultaneously operating said roll-form and said brake comprising an eccentric element at each end of said roller and a pair of levers individually associated with said eccentric element and interposed between said elements and said moveable member of said brake, whereby rotation of said roller effects reciprocatable movement of said moveable element of said brake.

4. In a metal working machine the combination of a frame comprising a base and a pair of upstanding support members thereon, a metal roll-form comprising three juxtaposed rollers individually rotatably mounted in said support members, drive means for at least one of said rollers to effect rotation thereof, a combination metal shear and brake comprising a moveable member reciprocatably mounted on said upstanding support members and having both a moveable shear blade and a moveable angle forming member, said combination further comprising a stationary shear blade and a stationary angle forming member on said frame for cooperation respectively with said shear blade and angle forming member on said moveable member, and means for operating said metal shear and brake with said roll-form comprising at least one eccentric element mounted on said one of said rollers for rotation therewith and a lever connected to said moveable member and engaging said eccentric element, whereby rotation of said one of said rollers by said drive means operates said roll-form and causes said eccentric element and lever to operate said metal shear and brake.

5. In a metal working machine the combination according to claim 4 wherein said eccentric element is a generally circular element attached to said one of said rollers such that its center of rotation is disposed a predetermined distance from the center of curvature of its generally circular configuration.

6. In a metal working machine the combination according to claim 5 wherein said lever for operating said metal shear and brake is formed with an opening for receiving said generally circular element, whereby rotation of said element effects reciprocable movement of the moveable member of said metal shear and brake.

No references cited.

WILLIAM W. DYER, JR., *Primary Examiner.*

LEONIDAS VLACHOS, *Examiner.*